(12) United States Patent
Yamamoto et al.

(10) Patent No.: US 10,139,530 B2
(45) Date of Patent: Nov. 27, 2018

(54) DECORATIVE SHEET

(71) Applicant: 3M INNOVATIVE PROPERTIES COMPANY, St. Paul, MN (US)

(72) Inventors: Takeo Yamamoto, Tendo (JP); Hidetoshi Abe, Tendo (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/399,981

(22) PCT Filed: Oct. 11, 2012

(86) PCT No.: PCT/US2012/059648
§ 371 (c)(1),
(2) Date: Nov. 10, 2014

(87) PCT Pub. No.: WO2013/172862
PCT Pub. Date: Nov. 21, 2013

(65) Prior Publication Data
US 2015/0147526 A1  May 28, 2015

(30) Foreign Application Priority Data
May 16, 2012 (JP) .................................. 2012-112454

(51) Int. Cl.
*G02B 5/128* (2006.01)
*E04F 15/16* (2006.01)
(Continued)

(52) U.S. Cl.
CPC ................ *G02B 5/128* (2013.01); *B32B 7/12* (2013.01); *B32B 15/08* (2013.01); *B32B 27/00* (2013.01);
(Continued)

(58) Field of Classification Search
CPC .. G02B 5/128; E04F 15/163; E04F 15/02172; B32B 27/00; B32B 15/08; B32B 7/12; Y10T 428/25; Y10T 428/24372
(Continued)

(56) References Cited

U.S. PATENT DOCUMENTS 4,248,932 A   2/1981 Tung et al.
4,405,657 A   9/1983 Miller, Jr.
(Continued)

FOREIGN PATENT DOCUMENTS

EP   1719638   11/2006
JP   56-3707    1/1981
(Continued)

OTHER PUBLICATIONS

International Search Report for PCT International Application No. PCT/US2012/059648 dated Mar. 27, 2013, 4 pages.
EP 12876932, EP Search Report, dated Dec. 18, 2015, 8 pages.

*Primary Examiner* — Nathan L Van Sell
(74) *Attorney, Agent, or Firm* — Daniel J. Iden

(57) ABSTRACT

To provide a decorative sheet which has anti-skid properties, is resistant to abrasion, exhibits high abrasion resistance even when bonded to a floor or road surface over which pedestrians or vehicles traverse, does not cause pedestrians or vehicles to skid, and does not suffer from damage or peeling. [Resolution Means] A decorative sheet having a first bead coat layer comprising a resin and particles having a median diameter of from 20 μm to 60 μm, a second bead coat layer which is coated on the first bead coat layer and which includes a resin and particles having a median diameter of from 20 μm to 60 μm, a design layer and an adhesive layer.

6 Claims, 1 Drawing Sheet

(51) Int. Cl.
   *E04F 15/02*   (2006.01)
   *B32B 27/00*   (2006.01)
   *B32B 15/08*   (2006.01)
   *B32B 7/12*    (2006.01)
(52) U.S. Cl.
   CPC ...... *E04F 15/02172* (2013.01); *E04F 15/163* (2013.01); *Y10T 428/24372* (2015.01); *Y10T 428/25* (2015.01)
(58) Field of Classification Search
   USPC .................................................. 428/141, 143
   See application file for complete search history.

(56) References Cited

U.S. PATENT DOCUMENTS

| | | | |
|---|---|---|---|
| 4,849,265 A | | 7/1989 | Ueda |
| 6,060,157 A | * | 5/2000 | LaPerre ............... B44C 1/16 428/212 |
| 6,297,297 B1 | | 10/2001 | Brookman |
| 2003/0044600 A1 | | 3/2003 | Okuyama |
| 2004/0161564 A1 | | 8/2004 | Truog |
| 2007/0237929 A1 | | 10/2007 | Suga |
| 2008/0078498 A1 | | 4/2008 | Ziek |
| 2010/0137524 A1 | * | 6/2010 | Grittner ............... C08J 3/247 525/330.5 |
| 2010/0166997 A1 | | 7/2010 | Chisaka |

FOREIGN PATENT DOCUMENTS

| | | |
|---|---|---|
| JP | H04-319107 | 11/1992 |
| JP | 1993-080793 U | 11/1993 |
| JP | H0580793 | 11/1993 |
| JP | 3098311 | 10/2000 |
| JP | 2001-265454 | 10/2001 |
| JP | 2001-328201 | 11/2001 |
| WO | WO 2009138124 | 11/2009 |
| WO | WO 2009/145961 | 12/2009 |
| WO | WO 2010056543 | 5/2010 |

\* cited by examiner

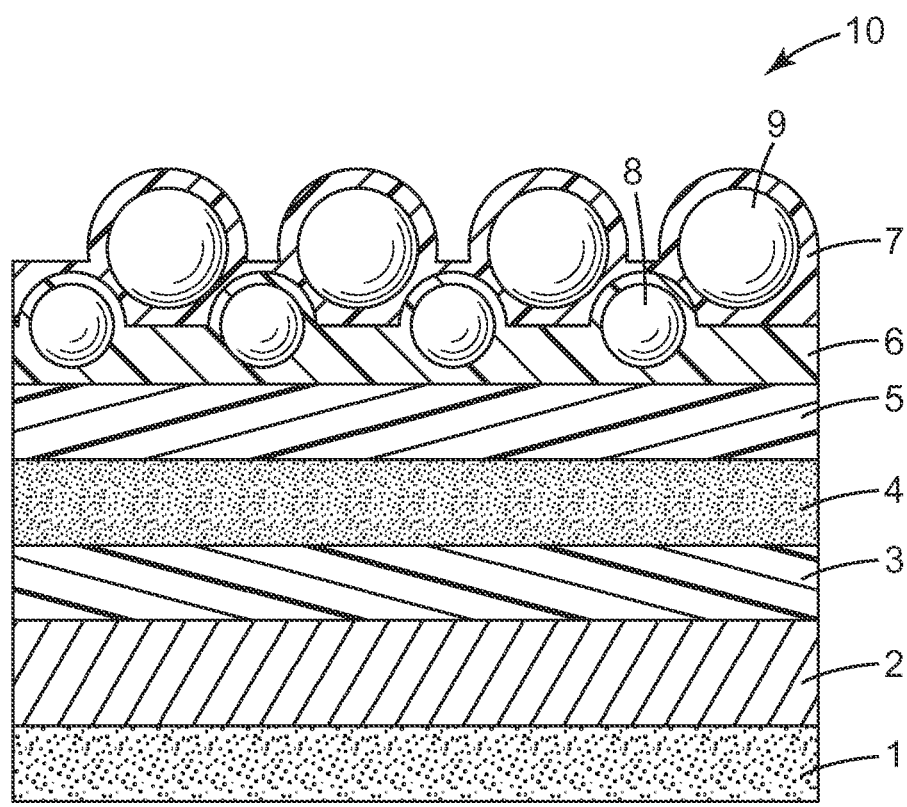

DECORATIVE SHEET

CROSS REFERENCE TO RELATED APPLICATIONS

This application is a national stage filing under 35 U.S.C. 371 of PCT/US2012/059648, filed Oct. 11, 2012, which claims priority to Japan Application No. 2012-112454, filed May 16, 2012, the disclosure of which is incorporated by reference in its/their entirety herein.

FIELD OF THE INVENTION

The present invention relates to a decorative sheet.

BACKGROUND

Decorative sheets with colors, patterns or letters/characters are bonded to road surfaces or floors.

For example, Japanese Unexamined Patent Application Publication No. S56-3707 discloses a pavement marking sheet material comprising a base sheet, a surface layer, and a single layer of particles which is partially embedded in the surface layer and partially exposed and which is supported by the surface layer.

In addition, Japanese Unexamined Patent Application Publication No. 2001-295454 discloses an adhesive sheet which includes a base layer, a protective layer disposed on the surface of the base layer, and an adhesive layer disposed on the rear surface of the base layer, wherein the above protective layer contains a surface-modifying agent that modifies the surface of the protective layer, a curable resin, and inorganic oxide particles.

This type of decorative sheet is bonded to indoor and outdoor floors or a surface of roads or parking lots in order to display information such as advertisements, direction indicators, traffic signs or directions, but because pedestrians and vehicles such as automobiles traverse the sheets bonded to floors, road surfaces and the like in this type of use, the surfaces of the decorative sheets tend to become damaged by abrasion or peel off. In particular, in cases where vehicles pass over decorative sheets or cases where vehicles make turns on decorative sheets, that is, cases where tires change direction on decorative sheets, the decorative sheets are readily damaged or peeled off.

SUMMARY OF THE INVENTION

Problem to be solved by the Invention

An object of the present invention is to provide a decorative sheet which has anti-skid properties, is resistant to abrasion, exhibits high adhesion even when bonded to a floor or road surface, which is subjected to high temperature in summer, over which pedestrians or vehicles traverse, does not cause pedestrians or vehicles to skid, and does not suffer from damage or peeling.

Means to Solve the Problem

Specifically, the present invention provides a decorative sheet including a first bead coat layer having a resin and particles having a median diameter of from 20 μm to 60 μm, a second bead coat layer which is laminated on the first bead coat layer and which comprises a resin and particles having a median diameter of from 20 μm to 60 μm, a design layer, and an adhesive layer.

Effect of the Invention

According to the present invention, it is possible to provide a decorative sheet which has anti-skid properties, is resistant to abrasion, exhibits high adhesion even when bonded to a floor or road surface over which pedestrians or vehicles traverse, does not cause pedestrians or vehicles to skid, and does not suffer from damage or peeling even under high temperature.

BRIEF DESCRIPTION OF THE DRAWING

FIG. 1 is a cross-sectional view of one example of a decorative sheet of the present invention.

DETAILED DESCRIPTION OF THE INVENTION

A decorative sheet of the present invention has a first bead coat layer, a second bead coat layer, a design layer and an adhesive layer.

The second bead coat layer is coated on the first bead coat layer and is positioned at the outermost layer of the decorative sheet.

The first and second bead coat layers each contain a resin and particles having a median diameter of from 20 μm to 60 μm.

Here, "containing particles having a median diameter of from 20 μm to 60 μm" means that 50% of the particles contained in the bead coat layers have a specific particle diameter that falls within the range from 20 μm to 60 μm. Median means the central value in the particle diameter distribution of the particles contained in the bead coat layers, and is expressed as "D50" in the present specification.

In addition, the bead coat layers may contain two or more types of particles having different particle diameters. For example, a case in which "particles having a median diameter of 30 μm and particles having a median diameter of 50 μm are contained at a mass ratio of 8:2" means that 80% of the particles contained in the bead coat layer have a median diameter of 30 μm and 20% of the particles contained in the bead coat layer have a median diameter of 50 μm.

The median diameters of the particles contained in the first bead coat layer and the second bead coat layer may be the same or different. In cases where these median diameters are different, the median diameter of the particles contained in the second bead coat layer may be greater than the median diameter of the particles contained in the first bead coat layer, or the median diameter of the particles contained in the second bead coat layer may be less than the median diameter of the particles contained in the first bead coat layer.

The combination of the median diameters of the particles contained in the first and second bead coat layers can be selected as appropriate and is not limited.

The particles are almost spherical particles comprising an inorganic or organic material, and are preferably non-tacky particles. Specifically, it is possible to use particles comprising, for example, alumina, silica, glass, another metal oxide, a polyester resin, a polystyrene resin, an acrylic resin or a urethane resin. In cases where particles comprising a resin are used, the particles are preferably crosslinked from the perspective of solvent resistance.

The resins contained in the first and second bead coat layers are not particularly limited as long as these resins are resins that do not exhibit tacky adhesive properties. It is preferable to use a resin which has good particle wettability and which has excellent film strength and solvent resistance. In addition, it is preferable to use a crosslinkable resin from the perspective of solvent resistance. Specifically, it is possible to use, for example, a urethane resin, an acrylic resin, a vinyl chloride resin, a silicone resin, an epoxy resin, a fluororesin, a melamine resin, and an alkyd resin or a mixture thereof. The viscosity of the resin can be from approximately 100 to approximately 5,000 centipoise.

The mass ratio of the particles and the resin in the bead coat layers is not particularly limited, but can be, for example, from approximately 8:2 to approximately 1:9.

The first bead coat layer can be obtained by, after adding the particles to the resin and blending, coating on the surface of the transparent film layer or the design layer by using a conventional publicly known method such as knife coating, and then drying.

The second bead coat layer can be obtained by, after adding the particles to the resin and blending, coating on the surface of the already prepared first bead coat layer by using a conventional publicly known method such as knife coating, and then drying.

In the present invention, the first bead coat layer and the second bead coat layer must be formed independently as separate layers.

The thickness of the first bead coat layer and the second bead coat layer is not particularly limited. For example, the thickness of the first bead coat layer and the second bead coat layer can be from approximately 10 μm to approximately 100 μm and approximately from 20 μm to approximately 80 μm respectively.

Furthermore, it is preferable for the particles not to be exposed from the resin and for the surface of the layers to be covered by the resin in the first bead coat layer and the second bead coat layer.

The coating weights of the first bead coat layer and the second bead coat layer are not particularly limited, but can be from approximately 10 g/m$^2$ to approximately 50 g/m$^2$.

The decorative sheet of the present invention contains a design layer. The design layer is constituted from a printed layer that is provided on a transparent film that is an optional constituent element or from a colored film obtained by coloring a plastic.

In cases where the design layer is a printed layer, the printed layer is provided on a transparent film layer by means of inkjet printing using a water-based ink, an organic solvent-based ink or a UV ink, silk screen printing, gravure printing, electrostatic printing, offset printing and the like.

The decorative sheet of the present invention contains a transparent film layer as an optional constituent element. The transparent film layer is a base material for the design layer. A film having sufficient strength (toughness) to fulfill the above mentioned role or a resin layer obtained by coating a resin on the surface of the design layer and then drying can be used as this type of transparent film layer.

This type of film can be a film comprising, for example, an acrylic polymer, a urethane-based polymer, a polyester such as polyethylene terephthalate (PET), poly(vinyl chloride), a polyolefin such as polyethylene or polypropylene (PP) or a fluorinated polymer. Of these, acrylic polymers are preferably used from the perspective of printability.

The thickness of the transparent film layer can be selected as appropriate, and is not limited. For example, this thickness can be from approximately 3 μm to approximately 500 μm or from approximately 5 μm to approximately 300 μm.

The decorative sheet may further contain a bonding layer as an optional constituent element. The bonding layer fulfills the role of bonding the two layers adjacent thereto and also imparts opacity. The bonding layer contains an adhesive comprising a conventional publicly known tacky adhesive polymer, such as an acrylic-based, rubber-based, urethane-based, polyester-based or silicone-based polymer. In cases where the bonding layer imparts opacity, it is possible to use a colored adhesive obtained by further adding a publicly known dye or pigment to these tacky adhesives. It is possible to use, for example, titanium oxide as a pigment. In this case, the colored adhesive will be white. By using a colored adhesive having a suitable opacity as the bonding layer, differences in color density in the design layer do not occur and it is possible to provide a sharper design.

The thickness of the bonding layer can be selected as appropriate, and is not limited. For example, this thickness can be from approximately 5 μm to approximately 200 μm or from approximately 10 μm to approximately 100 μm.

The decorative sheet may further contain a metal layer of aluminum, an aluminum alloy and the like as an optional constituent element. The metal layer imparts the decorative sheet with toughness and improves followability to uneven surfaces.

The thickness of the metal layer can be selected as appropriate, and is not limited. For example, this thickness can be from approximately 20 μm to approximately 200 μm.

The decorative sheet has an adhesive layer in order to bond the decorative sheet to an adherend such as a floor or road surface. The adhesive layer contains an adhesive (a pressure-sensitive adhesive) comprising a conventional publicly known adhesive polymer, such as an acrylic-based, urethane-based, polyester-based, rubber-based or silicone-based polymer. Those adhesive polymer may be crosslinked with known cross linking agents. Preferred adhesive polymer may be crosslinked acrylic-based polymer or rubber-based polymer.

The surface of the adhesive layer may be treated by electron beam (ebeam) to improve adhesion to the adherend. When using rubber
 based adhesive, the adhesion especially under high temperature such as 65° C. can be improved by ebeam treatment. Irradiance level of ebeam is not limited but may be from about 0.5 Mrad to about 10 Mrad or about 1 Mrad to about 6 Mrad.

The thickness of the adhesive layer is not particularly limited, but can be, for example, from approximately 10 μm to approximately 200 μm, from approximately 20 μm to approximately 150 μm, or from approximately 30 μm to approximately 100 μm.

The decorative sheet can be obtained by laminating an adhesive layer, a metal layer, a bonding layer, a design layer, a transparent film layer, a first bead coat layer and a second bead coat layer in that order. Furthermore, the decorative sheet may, if necessary, also have a layer having a different function, such as a primer layer. The adhesive layer and the second bead coat layer are the outermost layers, with the adhesive layer being on the adherend side and the second bead coat layer being on the opposite side thereto.

In addition, the decorative sheet may be provided with a liner (a release layer) on the outer side of the adhesive layer. This type of liner may be liners often used in fields of tacky adhesive tapes and the like, and is not limited to the specified components. Preferred liners include paper, plastic materials such as polyethylene, polypropylene, polyesters or cellulose acetate, paper that is covered or laminated with this type of plastic material, or other materials. These liners may be used without further modification, but can be used after being subjected to silicone treatment or treated using another method in order to improve the release properties thereof.

The decorative sheet can be produced by appropriately selecting a conventional publicly known method. An example of a production method is given below.

A transparent film layer is formed by coating a resin that constitutes the transparent film layer on a plastic film liner such as a polyester film by means of knife coating and the like and then drying.

A bead coat layer 1 is formed by coating a particle-containing resin solution that constitutes the bead coat layer 1 on the surface of the obtained transparent film layer that is opposite the liner, and then drying. A bead coat layer 2 is then formed by coating a particle-containing resin solution that constitutes the bead coat layer 2 on the bead coat layer 1 and then drying.

The liner is peeled from the transparent film layer, and a design layer is formed by printing on the surface of the transparent film layer by using an inkjet printer and the like.

A decorative sheet is then obtained by bonding an aluminum foil having an adhesive on both surfaces thereof (a film obtained by laminating white tacky adhesive/aluminum foil/acrylic or rubber tacky adhesive/liner) to the design layer.

The decorative sheet can be bonded to an indoor or outdoor floor or a road surface such as a road or parking lot so as to display information such as advertisements, direction indicators, traffic signs or directions.

The following abbreviations are used in the present specification.
BA: n-butyl acrylate
MEK: methyl ethyl ketone
AA: acrylic acid
MMA: methyl methacrylate
BMA: butyl methacrylate
DMAEMA: dimethyl aminoethyl methacrylate
IPA: Isopropyl alcohol

EXAMPLES

Example 1

Sample Preparation

The sample of Example 1 was prepared as follows. The materials used are as shown in Table 1.

Step 1: Preparation of Image-Receiving Film (Transparent Film Layer)

A mixed solution of P1, P2 and CL1 (see Table 1 for composition) was mixed with a mixer (TK Autohomomixer manufactured by Tokushu Kika Kogyo Co., Ltd.). The blending ratio of P1, P2 and CL1 was 100:75:0.15 in terms of solid content. The agitated solution was coated on a polyester film having a thickness of 50 μm by using a knife coater and then dried for 5 minutes at 95° C. and 2 minutes at 155° C. Following the drying, an image-receiving film having a thickness of 50 μm (excluding the polyester film) was obtained.

Step 2: Coating of Bead Coat Layer 1

A mixed solution of PU1, CL2, Beads 1 and FA1 (see Table 1 for composition) was mixed with a mixer (TK Autohomomixer manufactured by Tokushu Kika Kogyo Co., Ltd.). The blending ratio of PU1, CL2, Beads 1 and FA1 was 30:5:35:0.69 in terms of solid content. The bead coat layer 1 was formed by coating the agitated solution on the image-receiving layer by using a knife coater and then drying for 2 minutes at 65° C., 3 minutes at 90° C., and 2 minutes at 155° C. Following the drying, the coating weight of the bead coat layer 1 was 37 g/m².

Step 3: Coating of Bead Coat Layer 2

A mixed solution of PU1, CL2, Beads 2 and FA1 was mixed with a mixer (TK Autohomomixer manufactured by Tokushu Kika Kogyo Co., Ltd.). The blending ratio of PU1, CL2, Beads 2 and FA1 was 30:5:35:0.69 in terms of solid content. The bead coat layer 2 was formed by coating the agitated solution on the bead coat layer 1 by using a knife coater and then drying for 2 minutes at 65° C., 3 minutes at 90° C., and 2 minutes at 155° C. Following the drying, the coating weight of the bead coat layer 2 was 28 g/m².

Step 4: Printing of Design Layer

The design layer was formed by peeling the polyester film of the image-receiving film, which includes the bead coat layer 1 and the bead coat layer 2, and printing on the surface of the image-receiving film by using a solvent inkjet printer (SC540 manufactured by Roland DG Corporation).

Step 5: Bonding of Aluminum Foil Having Tacky Adhesive on Both Surfaces Thereof 40 parts by mass of methyl isobutyl ketone (MIBK) was added to 10 parts by mass of an acrylic resin 1 (compositional ratio of methyl methacrylate (MMA)/butyl methacrylate (BMA)/dimethyl aminoethyl methacrylate (DMAEMA)=60:34:6 (mass ratio); weight average molecular weight (Mw)=approximately 70,000; Tg=approximately 66° C.; supplied as an ethyl acetate solution) and 50 parts by mass of titanium oxide (TiPure R960 produced by DuPont), and agitated for 10 minutes in a paint shaker (ARE250 manufactured by Thinky Corporation), so as to obtain a pigment premix solution.

Next, an adhesive component obtained by adding 50 parts by mass of titanium oxide 1 and 10 parts by mass of the acrylic resin 1 to 100 parts by mass of an adhesive polymer 1 (compositional ratio of butyl acrylate (BA)/acrylic acid (AA)=96:4 (mass ratio); Tg=approximately −50° C.; Mw=approximately 580,000; supplied as an ethyl acetate/toluene solution) was blended with the obtained pigment premix, thereby preparing a white adhesive composition solution. 0.2 parts by mass (in terms of solid content) of a crosslinking agent 1 (bisamide type, 1,1'-isophthaloyl-bis(2-methylaziridine) was added to 100 parts by mass of the tacky adhesive polymer 1. Compatibility of the tacky adhesive and the pigment was good, and dispersion was easily achieved. A white adhesive layer was obtained by coating the obtained white adhesive composition solution on an aluminum foil having a thickness of 50 μm by using a knife coater so that the thickness of the coating layer after drying was 30 μm, and then heating for 5 minutes at 90° C., drying and crosslinking. The white adhesive was protected by bonding a silicon-treated polyester liner having a thickness of 25 μm.

Next, an adhesive polymer 2 (acrylic tacky adhesive SK-Dyne 1429 F2 produced by Soken Chemical & Engineering Co., Ltd.) was coated on a polyethylene-laminated paper liner, which had been subjected to silicone treatment on both surfaces, so that the thickness of the coating layer after drying was 45 μm. Following the drying, an aluminum foil having an adhesive on both surfaces was prepared by bonding the obtained paper liner to the aluminum foil on the surface opposite the side on which the white adhesive layer was formed.

The liner was peeled from the white adhesive layer of the obtained aluminum foil having an adhesive on both surfaces, and the aluminum foil having an adhesive on both surfaces was laminated on the design layer.

Example 2

Example 2 was prepared in the same manner as Example 1, except that the coating weight of the bead coat layer 2 was 33 g/m$^2$.

Example 3

Example 3 was prepared in the same manner as Example 1, except that the coating weight of the bead coat layer 2 was 37 g/m$^2$.

Comparative Example 1

Comparative Example 1 was prepared in the same manner as Example 1, except that the bead coat layer 2 was not provided.

Comparative Examples 2 to 5

Step 1: Preparation of Image-Receiving Film
An image-receiving layer was prepared in the same manner as in Example 1.
Step 2: Coating of Bead Coat Layer 1
A mixed solution of PU1, CL2, Beads 1 and FA1 (see Table 1 for composition) was mixed with a mixer (TK Autohomomixer manufactured by Tokushu Kika Kogyo Co., Ltd.). The blending ratio of PU1, CL2, Beads 3 and FA1 was 30:5:35:0.69 in terms of solid content. The bead coat layer 1 was formed by coating the agitated solution on the image-receiving layer by using a knife coater and then drying for 2 minutes at 65° C., 3 minutes at 90° C., and 2 minutes at 155° C. Following the drying, the coating weight of the bead coat layer 1 in Comparative Examples 2, 3, 4 and 5 was 74, 84, 88 and 96 g/m$^2$ respectively.
Step 3: Printing of Design Layer
The design layer was formed by peeling the polyester film of the image-receiving film, which had the bead coat layer 1 and the bead coat layer 2, and printing on the surface of the image-receiving film using a solvent inkjet printer (SC540 manufactured by Roland DG Corporation).
Step 4: Bonding of Aluminum Foil Having Tacky Adhesive on Both Surfaces Thereof
The liner was peeled from the white adhesive layer of an aluminum foil having an adhesive on both surfaces, which was prepared in the same manner as Step 5 in Example 1, and the aluminum foil having an adhesive on both surfaces was laminated on the design layer.

Example 4

Example 4 was prepared in the same manner as Example 1, except that Beads 1 was used in the alumina beads in the bead coat layer 2 and the coating weight of the bead coat layer 2 was 38.7 g/m$^2$.

Example 5

Example 5 was prepared in the same manner as Example 1, except that a mixture of Beads 1 and Beads 2 (blending ratio was Beads 1:Beads 2=8:2) was used in the alumina beads in the bead coat layer 2 and the coating weight of the bead coat layer 2 was 38.2 g/m$^2$.

Example 6

Example 6 was prepared in the same manner as Example 1, except that a mixture of Beads 1 and Beads 2 (blending ratio was Beads 1:Beads 2=9:1) was used in the alumina beads in the bead coat layer 2 and the coating weight of the bead coat layer 2 was 39.6 g/m$^2$.

Example 7

Example 7 was prepared in the same manner as Example 1, except that Beads 2 was used in the alumina beads in the bead coat layer 1, Beads 1 was used in the bead coat layer 2 and the coating weights of the bead coat layer 1 and the bead coat layer 2 were 35 g/m$^2$ and 44 g/m$^2$ respectively.

Example 8

Example 8 was prepared in the same manner as Example 1, except that Beads 1 was used in the alumina beads in the bead coat layer 1, Beads 4 was used in the bead coat layer 2 and the coating weights of the bead coat layer 1 and the bead coat layer 2 were 37 g/m$^2$ and 26 g/m$^2$ respectively.

Example 9

Example 9 was prepared in the same manner as Example 8, except that the coating weight of the bead coat layer 2 was 33 g/m$^2$.

Comparative Examples 6 to 8

Step 1: Preparation of Image-Receiving Film
An image-receiving film was prepared in the same manner as in Example 1.
Step 2: Coating of Bead Coat Layer 1
A mixed solution of PU1, CL2, Beads 2 and FA1 (see Table 1 for composition) was mixed with a mixer (TK Autohomomixer manufactured by Tokushu Kika Kogyo Co., Ltd.). The blending ratio of PU1, CL2, Beads 2 and FA1 was 30:5:35:0.69 in terms of solid content. The bead coat layer 1 was formed by coating the agitated solution on the image-receiving layer by using a knife coater and then drying for 2 minutes at 65° C., 3 minutes at 90° C., and 2 minutes at 155° C. Following the drying, the coating weight of the bead coat layer 1 in Comparative Examples 6, 7 and 8 was 80, 88 and 110 g/m$^2$ respectively.
Step 3: Printing of Design Layer
The design layer was formed by peeling the polyester film of the image-receiving film, which has the bead coat layer 1 and the bead coat layer 2, and printing on the surface of the image-receiving film using a solvent inkjet printer (SC540 manufactured by Roland DG Corporation).
Step 4: Bonding of Aluminum Foil Having Tacky Adhesive on Both Surfaces Thereof
The liner was peeled from the white adhesive layer of an aluminum foil having an adhesive on both surfaces, which was prepared in the same manner as Step 5 in Example 1, and the aluminum foil having an adhesive on both surfaces was laminated on the design layer.

Comparative Example 9

Comparative Example 9 was prepared in the same manner as Examples 6 to 8, except that a mixture of Beads 1 and Beads 2 (blending ratio was Beads 1:Beads 2=2:8) was used in the alumina beads in the bead coat layer 1 and the coating weight of the bead coat layer 1 was 27 g/m$^2$.

Comparative Example 10

Comparative Example 10 was prepared in the same manner as Examples 6 to 8, except that a mixture of Beads 1 and Beads 2 (blending ratio was Beads 1:Beads 2=5:5) was used in the alumina beads in the bead coat layer 1 and the coating weight of the bead coat layer 1 was 25 g/m².

Comparative Example 11

Comparative Example 11 was prepared in the same manner as Examples 6 to 8, except that a mixture of Beads 1 and Beads 2 (blending ratio was Beads 1:Beads 2=8:2) was used in the alumina beads in the bead coat layer 1 and the coating weight of the bead coat layer 1 was 33 g/m².
Test Method
Dry Steering Test A test piece cut to a size of 15 cm×20 cm was bonded to asphalt. The front wheels of a passenger car weighing approximately 2 tons (a Toyota Alphard) were positioned on the test piece.

With the car stationary, the steering wheel was turned to the right so as to turn the tires as far as possible to the right. The steering wheel was then returned to the central position so that the tires were again parallel to the car. With this procedure constituting 1 cycle, the cycle was then carried out again in the same manner, but with the tires turned to the left instead of to the right, and then again with the tires turned to the right, making for a total of 3 cycles. A case in which no tearing or peeling of the film occurred was deemed to be a pass, and a case in which tearing or peeling of the film occurred was deemed to be a fail, and the results are shown in Table 2.
Abrasion Resistance Test The liner was peeled from a sample cut to a size of 10 mm (width)×10 mm (length), the sample was bonded to an aluminum plate, and a premask was peeled off. The abrasion resistance was evaluated in accordance with JIS A 1453. Using S-42 type sandpaper, cleaning the roller with a brush every 100 revolutions and replacing the sandpaper every 500 revolutions, the white adhesive layer was abraded, and the number of revolutions until the white color of the graphic film disappeared was measured. The results are given in table 2.
Skid Resistance Test The liner was peeled from a sample, the sample was bonded to asphalt, and a premask was peeled off. Wet skid resistance was measured in accordance with ASTM E303-83. The results are given in table 2. A higher B.P.N. (British Pendulum Number) value indicates less skidding.
Adhesion Test
20° C.

Sample was cut into 25 mm width by 150 mm length. The cut sample was applied to aluminum panel and mortar panel respectively. After standing for 48 hours at 20° C., 180° peel force was measured with a tensile testing machine (Tensilon produced by A&D Company, LImited), in accordance with 115 Z 0237 8.2.3. The tension rate was 300 mm/min. 65° C.

Sample was cut into 25 mm width by 150 mm length. The cut sample was applied to aluminum panel and mortar panel respectively. After standing for 48 hours at 20° C., the sample was stored in an oven at 65° C., then 180° peel force was measured with a tensile testing machine (Tensilon produced by A&D Company, LImited). The tension rate was 300 mm/min. The results are shown in Table 3.

Example 10

Sample Preparation
The sample of Example 10 was prepared as follows. The materials used are as shown in Table 1.

Steps 1 to 4:
Preparation of image-receiving film (transparent film layer), coating of bead coat layer 1, coating of bead coat layer 2 and printing of design layer were conducted in the same manner as Example 1, then the intermediate sample including the first and second bead coat layers, the image-receiving film and the design layer was obtained.
Step 5: Preparation of a White Adhesive on Aluminum Foil Ten parts by mass of P1, 50 parts by mass of titanium oxide (R960, made by DuPont), and 40 parts by mass of MIBK were prepared and obtained a solution. The solution was mixed with Paint shaker (ARE250, made by Thinky) for 10 minutes, then pre-mix solution was obtained. To the pre-mix solution, 100 parts by mass of P3 and CL3 was added (P3:CL3=100:0.2 in solid ratio).

40 parts by mass of methyl isobutyl ketone (MIBK) was added to 10 parts by mass of an acrylic resin 1 (compositional ratio of methyl methacrylate (MMA)/butyl methacrylate (BMA)/dimethyl aminoethyl methacrylate (DMAEMA) =60:34:6 (mass ratio); weight average molecular weight (Mw)=approximately 70,000; Tg=approximately 66° C.; supplied as an ethyl acetate solution) and 50 parts by mass of titanium oxide (TiPure R960 produced by DuPont), and agitated for 10 minutes in a paint shaker (ARE250 manufactured by Thinky Corporation), so as to obtain a pigment premix solution.

Next, an adhesive component obtained by adding 50 parts by mass of titanium oxide 1 and 10 parts by mass of the acrylic resin 1 to 100 parts by mass of an adhesive polymer 1 (compositional ratio of butyl acrylate (BA)/acrylic acid (AA)=96:4 (mass ratio); Tg=approximately −50° C.; Mw=approximately 580,000; supplied as an ethyl acetate/ toluene solution) was blended with the obtained pigment premix, thereby preparing a white adhesive composition solution. 0.2 parts by mass (in terms of solid content) of CL3 was added to 100 parts by mass of PSA1. Compatibility of the tacky adhesive and the pigment was good, and dispersion was easily achieved. A white adhesive layer was obtained by coating the obtained white adhesive composition solution on an aluminum foil having a thickness of 50 μm by using a knife coater so that the thickness of the coating layer after drying was 30 μm, and then heating for 5 minutes at 90° C., drying and crosslinking. The white adhesive was protected by bonding a silicon-treated polyester liner having a thickness of 25 μm.
Step 6: Coating PSA and Ebeam Curing Rubber PSA1 was knife-coated on the silicone coated paper release liner and dried at 90° C. for 5 minutes, then 50 μm thick PSA was obtained. The obtained PSA was exposed to 1 Mrad of ebeam. The PSA was laminated to aluminum layer obtained in Step 5.

Example 11

Example 11 was prepared in the same manner as Example 1 except that ebeam dose was 2 Mrad.

Example 12

Example 12 was prepared in the same manner as Example 1 except that E-beam dose was 4 Mrad.

Example 13

Example 13 was prepared in the same manner as Example 1 except that Ebeam dose was 6 Mrad.

Example 14

Example 14 was prepared in the same manner as Example 11 except that CL4 was added to PSA1, where the ratio was PSA1:CL4=100:0.78.

Example 15

Example 15 was prepared in the same manner as Example 12 except that CL4 was added to PSA1, where the ratio was PSA1:CL4=100:0.78.

Example 16

Example 16 was prepared in the same manner as Example 13 except that CL4 was added to PSA1, where the ratio was PSA1:CL4=100:0.78.

Example 17

Example 17 was prepared in the same manner as Example 14 except that none of Ebeam was exposed.

Example 18

Example 18 was prepared in the same manner as Example 1 except that none of Ebeam was exposed.

Example 19

Example 19 was prepared in the same manner as Example 1 except that PSA2 was coated by twin screw extruder. Coating weight of PSA2 was 87 g/sqm. Ebeam dose was 4 Mrad.

Example 20

Example 20 was prepared in the same manner as Example 19 except that the coating weight of PSA2 was 217 g/sqm.

TABLE 1

| | Ingredient | Tg (° C. cal.) | Molecular Weight | Diluting solvent | Solid content (%) |
|---|---|---|---|---|---|
| Polymer 1 (P1), High Tg acrylic polymer | MMA-BMA-DMAEMA = 60:34:6 | 63 | 68,000 | ethyl acetate | 40 |
| Polymer 2 (P2), Low Tg acrylic polymer | BA-AA = 94:6 | −48 | 760,000 | Toluene/ethanol | 33 |
| Polymer 3 (P3), Low Tg acrylic polymer | BA-AA = 96:4 | −50 | 580,000 | Toluene/ethanol | 33 |
| Polyurethane resin (PU1) | Polyurethane resin (MCPV-12 produced by Nippon Polyurethane Industry Co., Ltd.) | ** | ** | MEK/cyclohexane | 30 |
| Polyurethane resin (PU2) | Polyurethane resin (Nippollan 5196 produced by Nippon Polyurethane Industry Co., Ltd.) | ** | ** | MEK/cyclohexane | 30 |
| Fluorine additive 1 (FA1) | Perfluoroalkyl group-containing oligomer (Megafac MCF-350 produced by DIC) | ** | ** | ** | 100 |
| Alumina beads 1 (Beads 1) | Alumina beads (Alunabeads® CB-A30S produced by Showa Denko Kabushiki Kaisha) D50 = 28.1 μm | ** | ** | ** | 100 |
| Alumina beads 2 (Beads 2) | Alumina beads (Alunabeads® CB-A50S produced by Showa Denko Kabushiki Kaisha) D50 = 48.6 μm | ** | ** | ** | 100 |
| Alumina beads 3 (Beads 3) | Alumina beads (Alunabeads® CB-A40 produced by Showa Denko Kabushiki Kaisha) D50 = 41.1 μm | ** | ** | ** | 100 |
| Alumina beads 4 (Beads 4) | Alumina beads (Alunabeads® CB-A20S produced by Showa Denko Kabushiki Kaisha) D50 = 22.1 μm | ** | ** | ** | 100 |
| Crosslinking agent 1 (CL1) | Epoxy crosslinking agent (E-AX produced by Soken Chemical & Engineering Co., Ltd.) | ** | ** | Toluene | 5 |
| Crosslinking agent 2 (CL2) | Isocyanate (Coronate HX produced by Nippon Polyurethane Industry Co., Ltd.) | ** | ** | ** | 100 |
| Crosslinking agent 3 (CL3) | Bisamide (1,1'-isophtharoyl-bis(2-methyladiridine) | ** | ** | Toluene | 5 |
| Crosslinking agent 4 (CL4) | Isocyanate (Coronate L55E produced by Nippon Polyurethane Industry Co., Ltd.) | ** | ** | Ethanol | 55 |

TABLE 1-continued

| | Ingredient | Tg (° C. cal.) | Molecular Weight | Diluting solvent | Solid content (%) |
|---|---|---|---|---|---|
| Rubber PSA1 | Butadiene rubber 28%<br>Butadiene-styrene copolymer 9%<br>Terpene resin 28%<br>Calcium carbonate 18%<br>Petroleum resin 7%<br>Phenol resin 6%<br>Aluminum hydroxide 4% | ** | ** | Toluene<br>n-hexane<br>IPA | 40 |
| Rubber PSA2 | Polybutadiene elastomer 47%<br>Alpha-pinene tackifier 53% | ** | ** | None | 100 |

TABLE 2

| | Bead coat layer 1 | | Bead coat layer 2 | | Stationary steering test Result | Abrasion resistance test (Revolutions) | Skid resistance test (B.P.N) |
|---|---|---|---|---|---|---|---|
| Sample | Median diameter | Coating weight (g/m²) | median diameter | Coating weight (g/m²) | | | |
| Ex 1 | 28.1 μm | 37 | 48.6 μm | 28 | Pass | 1600 | 64 |
| Ex 2 | 28.1 μm | 37 | 48.6 μm | 33 | Pass | 1900 | 63 |
| Ex 3 | 28.1 μm | 37 | 48.6 μm | 37 | Pass | 1900 | 61 |
| Ex 4 | 28.1 μm | 37 | 28.1 μm | 39 | Pass | 1600 | 42 |
| Ex 5 | 28.1 μm | 37 | 28.1 μm:48.6 μm = 8:2 | 38 | Pass | 1700 | 43 |
| Ex 6 | 28.1 μm | 37 | 28.1 μm:48.6 μm = 9:1 | 40 | Pass | 1700 | 43 |
| CEx 1 | 28.1 μm | 37 | none | | Pass | 1100 | 39 |
| CEx 2 | 41.1 μm | 74 | none | | Pass | 300 | 80 |
| CEx 3 | 41.1 μm | 84 | none | | Fail | 500 | 66 |
| CEx 4 | 41.1 μm | 88 | none | | Pass | 700 | 62 |
| CEx 5 | 41.1 μm | 96 | none | | Fail | 900 | 62 |
| CEx 6 | 48.6 μm | 80 | none | | Pass | 500 | 53 |
| CEx 7 | 48.6 μm | 88 | none | | Pass | 800 | 45 |
| CEx 8 | 48.6 μm | 110 | none | | Fail | 900 | 44 |
| Ex 7 | 48.6 μm | 35 | 28.1 μm | 44 | Pass | 3000 | 47 |
| Ex 8 | 28.1 μm | 37 | 22.1 μm | 26 | Pass | 1300 | 43 |
| Ex 9 | 28.1 μm | 37 | 22.1 μm | 33 | Pass | 1300 | 37 |
| CEx 9 | 28.1 μm:48.6 μm = 2:8 | 27 | none | | Pass | 500 | 66 |
| CEx 10 | 28.1 μm:48.6 μm = 5:5 | 25 | none | | Pass | 500 | 57 |
| CEx 11 | 28.1 μm:48.6 μm = 8:2 | 33 | none | | Pass | 800 | 60 |

TABLE 3

| | | | Ebeam irradiance (Mrad) | Adhesion | | | |
|---|---|---|---|---|---|---|---|
| | | | | Aluminum panel | | Mortar | |
| Sample | PSA | Crosslinking agent | | 20° C. (N/25 mm) | 65° C. (N/25 mm) | 20° C. (N/25 mm) | 65° C. (N/25 mm) |
| Example 10 | PSA1 | None | 1 | 41 | 12 | 34 | 15 |
| Example 11 | PSA1 | None | 2 | 45 | 22 | 33 | 21 |
| Example 12 | PSA1 | None | 4 | 35 | 16 | 31 | 20 |
| Example 13 | PSA1 | None | 6 | 35 | 15 | 25 | 18 |
| Example 14 | PSA1 | CL4 | 2 | 40 | 19 | 31 | 28 |
| Example 15 | PSA1 | CL4 | 4 | 34 | 14 | 28 | 21 |
| Example 16 | PSA1 | CL4 | 6 | 30 | 13 | 27 | 17 |
| Example 17 | PSA1 | CL4 | None | 51 | 8 | 51 | 17 |
| Example 18 | PSA1 | None | None | 46 | 6 | 47 | 6 |
| Example 19 | PSA2(20 grain) | None | 4 | 47 | 15 | 49 | 22 |
| Example 20 | PSA2(50 grain) | None | 4 | 74 | 27 | 83 | 34 |

REFERENCE NUMERALS

10 Decorative sheet
1 Adhesive layer
2 Metal layer
3 Bonding layer
4 Design layer
5 Transparent film layer (image-receiving film)
6 First bead coat layer
7 Second bead coat layer
8 Particles in first bead coat layer
9 Particles in second bead coat layer

What is claimed is:

1. A decorative sheet comprising a first bead coat layer including a resin and particles having a median diameter of from 20 μm to 60 μm, a second bead coat layer which covers the first bead coat layer and includes a resin and particles having a median diameter of from 20 μm to 60 μm, wherein the particles in the second bead coat layer are at least partially protruded upward, a design layer, and an adhesive layer, wherein the first bead coat layer and the second bead coat layer are unpatterned and are formed independently as separate layers, and the median diameter of the particles contained in the second bead coat layer is greater than the median diameter of particles contained in the first bead coat layer.

2. The decorative sheet according to claim 1, which contains an adhesive layer, a metal layer, a bonding layer, a design layer, a transparent film layer, a first bead coat layer and a second bead coat layer in that order.

3. The decorative sheet according to claim 2, wherein the bonding layer contains a colored adhesive.

4. The decorative sheet according to claim 3, wherein the colored adhesive contains titanium oxide.

5. The decorative sheet according to claim 1, wherein the adhesive layer contains an adhesive comprising crosslinked acrylic-based adhesive polymer.

6. The decorative sheet according to claim 1, wherein the adhesive layer comprises an adhesive comprising rubber-based adhesive and the surface of the adhesive layer is treated with ebeam.

* * * * *

UNITED STATES PATENT AND TRADEMARK OFFICE
CERTIFICATE OF CORRECTION

PATENT NO. : 10,139,530 B2
APPLICATION NO. : 14/399981
DATED : November 27, 2018
INVENTOR(S) : Takeo Yamamoto et al.

Page 1 of 1

It is certified that error appears in the above-identified patent and that said Letters Patent is hereby corrected as shown below:

In the Specification

<u>Column 9</u>
Line 54, Delete "115" and insert -- JIS --, therefor.

Signed and Sealed this
Sixteenth Day of July, 2019

Andrei Iancu
*Director of the United States Patent and Trademark Office*